United States Patent [19]

Arnold et al.

[11] Patent Number: 4,794,723

[45] Date of Patent: Jan. 3, 1989

[54] FLOATING BAIT BUCKET

[76] Inventors: Claude M. Arnold, 11 St. Peter's Walk, Sugarland, Tex. 77479; Clem H. Cook, 2612 Eastgrove La., Houston, Tex. 77027

[21] Appl. No.: 72,632

[22] Filed: Jul. 13, 1987

[51] Int. Cl.$^4$ ............................................. A01K 97/00
[52] U.S. Cl. ................................. 43/55; 43/54.1; 43/56
[58] Field of Search ........................ 43/55–57, 43/54.1

[56] References Cited

U.S. PATENT DOCUMENTS

| | | | |
|---|---|---|---|
| 1,576,688 | 3/1926 | Thompson | 43/54.1 X |
| 2,560,054 | 7/1951 | Wells | 43/55 |
| 3,478,463 | 11/1969 | Ruter | 43/55 |
| 3,717,124 | 2/1973 | Jacobs | 43/55 X |
| 3,882,628 | 5/1975 | Stouder | 43/55 |
| 3,958,359 | 5/1976 | Doughty | 43/55 |
| 4,095,365 | 6/1978 | Ray | 43/55 |
| 4,638,593 | 1/1987 | Garcia | 43/56 X |
| 4,671,008 | 6/1987 | Lindemood | 43/56 X |

Primary Examiner—Fred A. Silverberg
Assistant Examiner—Carmine Cuda
Attorney, Agent, or Firm—Gunn, Lee & Jackson

[57] ABSTRACT

The present disclosure is directed to a floating bait bucket and more particularly includes a surrounding ring formed of a foamed plastic material of closed cell construction providing buoyancy. The ring encircles a central deck. The deck supports a rectangular compartment lined with foamed plastic material which serves as a insulated storage chamber. It has a hinged lid which fastens with a latch. On top of that, another storage compartment is provided to receive fishing tackle. On top of that, a hinged lid closes over the fishing tackle to assure that the fishing tackle is secured therein. The device also supports a bait bucket having a lid and perforated sides to contain bait therein with water flow to assure that the bait is kept alive.

3 Claims, 2 Drawing Sheets

FLOATING BAIT BUCKET

BACKGROUND OF THE DISCLOSURE

It is quite common for fishermen to wade in shallow waters while fishing. A typical example is wade fishing in the shallow water areas along the U.S. Gulf Coast. There, the bottom slopes gently from the shoreline to permit a wade fisherman to walk quite a distance out into the water. This is also commonly done in many other areas and regions, limited primarily by water temperature, dangerous currents, and steepness of the bottom extending from the shoreline. The paraphernalia required for fishing is as simple or as complex as one might wish. Realistically, however, wade fishing practically always requires at least some spare fishing gear such as additional lures, etc. to make a change or to replace those otherwise lost. Another factor required for practically any fisherman is available bait. While it is possible to fish with artificial lures, it is desirable to fish with live bait and in particular with live minnows, shrimp, etc. It is not otherwise possible to carry bait in the water except in some kind of bait bucket. At this juncture, the bait bucket becomes unwieldy. It must be drug or otherwise rested on the bottom. Ordinarily, it must be submerged to some extend to provide continual water interchange to keep the bait alive. In any event, the equipment essential for operation of a wading fisherman is unwieldy and involves many different things.

Snacks may be desirable, but they cannot be carried easily. Additional fishing tackle is limited to only that which the wading fisherman can put in his pocket or perhaps hang from loops on a belt. Often, a stringer for newly caught fish must also be included. All of these entanglements add to the complexity, and thereby inhibit wading fishing.

The apparatus of the present disclosure is a unified device which carries all of the equipment wanted by the wading fisherman. It incorporates an integral bait bucket primarily submerged in the water to keep the bait alive. Moreover, the bait bucket is supported by a surrounding ring shaped float so that it is not out of sight on the bottom but it is at arm's length from the fisherman. This makes the bait bucket far more accessible. In addition to this, the present apparatus has a sealed, lid covered tackle box with a snap latch enabling the lid to be opened and closed. The tackle box enables the fisherman to store and quickly obtain any number of additional pieces of fishing equipment. The tackle box is arranged over an adjacent box containing an insulated compartment suitable for storing sandwiches, canned drinks, and the like. This makes refreshments readily available. The present apparatus is constructed with a hole formed in it to receive the butt end of a fishing pole so that the fishing pole or fly rod can be rested while the fisherman has both hands free. This is often needed so that the fisherman can tie lures and other equipment on the fishing line.

All of this equipment is constructed as a unit with a surrounding ring of resilient foamed plastic material. This ring provides stability and support. It is constructed with various internal compartments, some being insulated to maintain thermal protection and other being perforated to permit water transfer. All of the equipment is constructed as a unit so that it might be tied by a suitable, convenient line to the belt of the fisherman. Conveniently, also, a tab is included to enable the fisherman to anchor a stringer on this apparatus. The stringer hangs over the side to hold any fish that have been caught by the fisherman. It is perhaps safer to hang the stringer off to the side and away from the fisherman. This keeps the recently caught fish from entangling around the fisherman. It is safer to do this because the stringer may attract large aggressive fish including sharks, barracuda and the like. Occasionally, they will strike at the stringer close to the fisherman and sometimes injure the fisherman.

While the foregoing is directed to the background of the present apparatus and briefly summarizes the structure of the present invention, a detailed description is set forth below in reference to the attached drawings.

IN THE DRAWINGS

So that the manner in which the above recited features, advantages and objects of the present invention are attained and can be understood in detail, more particular description of the invention, briefly summarized above, may be had by reference to the embodiments thereof whicha re illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
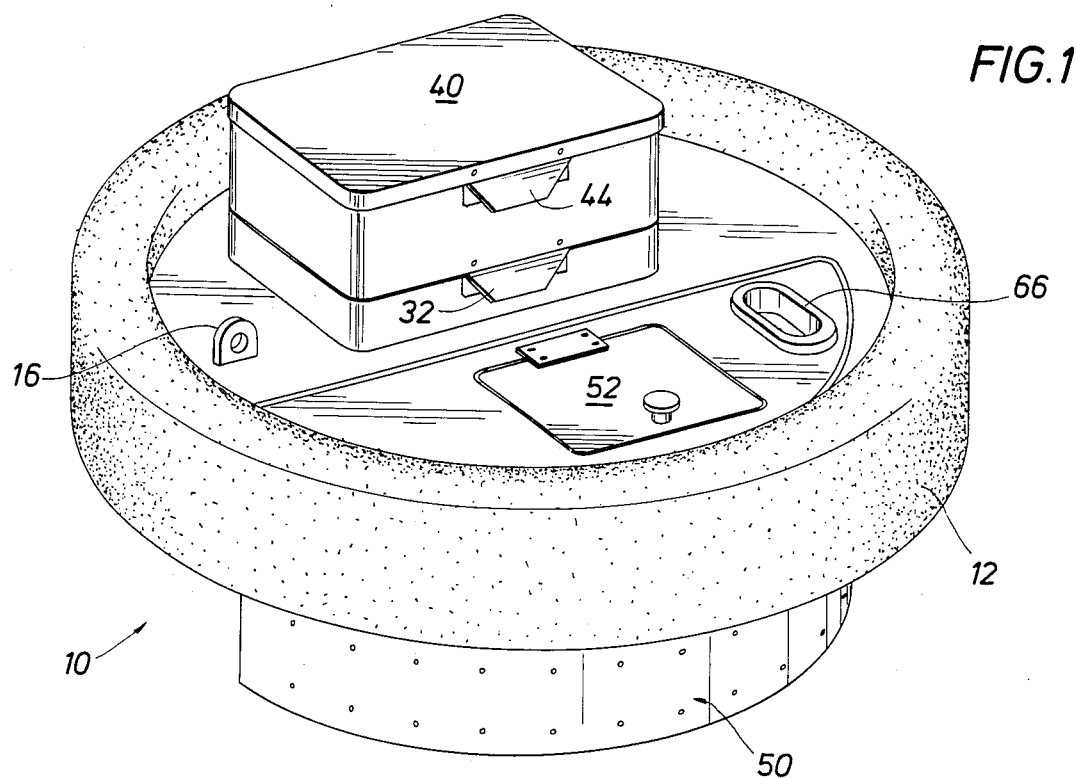
FIG. 1 is a perspective view of the bait bucket and associated apparatus of the present disclosure for use by a wade fisherman.

Attention is first directed to FIG. 1 of the drawings where the numeral 10 identifies the apparatus of the present disclosure. It will be named a floating bait bucket, but as will be developed, it include more than a bait bucket. The floating bait bucket 10 is constructed with a surrounding closed cell ring 12. The ring 12 is a lightweight foam material of the sort appropriate for flotation. It is relatively light and need not be structurally large. It is glued or adhesively joined to a central decking member 14. The deck 14 is a circular member of plastic material. The deck 14 supports one or more upstanding tabs 16 suitable for tying fish leaders and the like. The flotation ring 12 is constructed with a vertical extent to assure that it rides on the water to locate a portion of the equipment underwater. Likewise, a portion of the equipment above the deck 14 is held above the water. This enables fisherman access to certain portions of the equipment from above.

Figure 3:
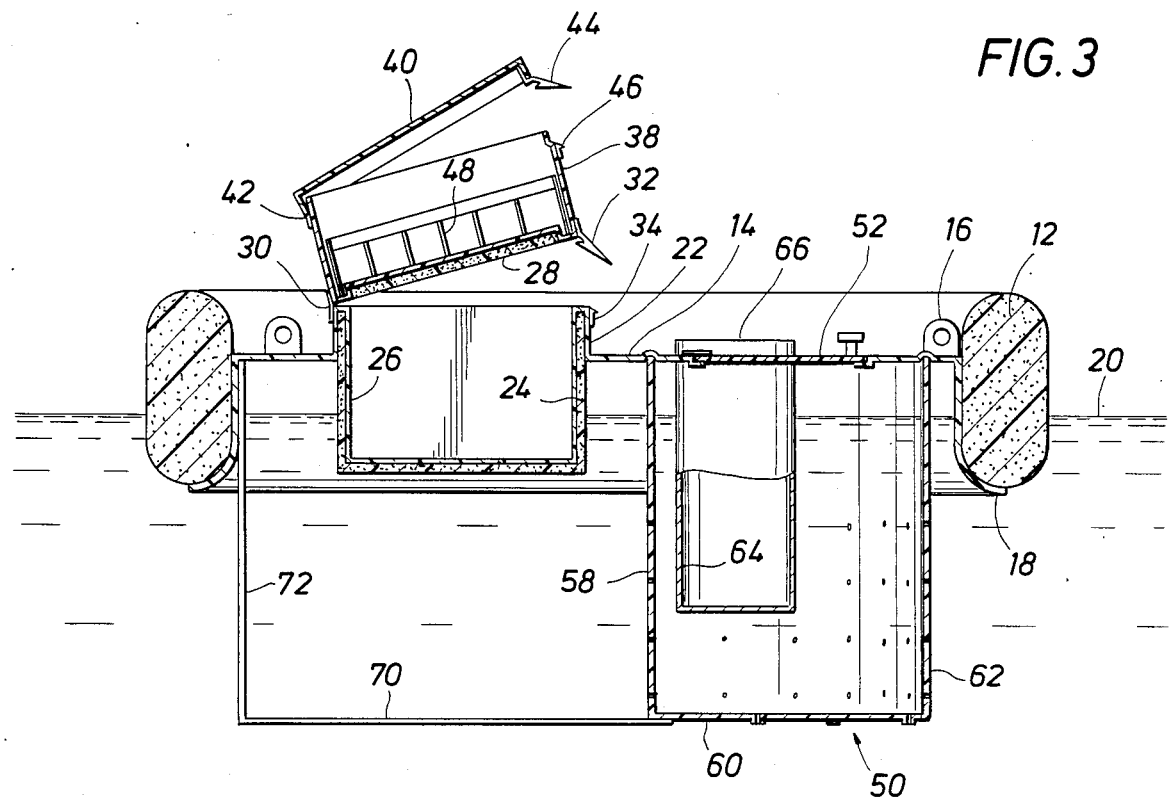
FIG. 3 is a sectional view along the diameter of the circular structure shown in FIG. 2 and illustrating internal details of construction of a tackle box, a refrigerated container, and a bait bucket for storing live bait.

Attention is directed to FIG. 3 of the drawings where the flotation ring 12 is shown in greater detail. The deck 14 is constructed with a cylindrical flared lower skirt 18 which nests against the ring. They are conveniently joined together by some means, an adhesive being preferred. This assures that the ring holds the deck member 14 above the water. The water line is identified at 20. This is below the deck 14. The deck is supported at this elevation to enable certain components to be positioned above the water line. The deck 14 is perforated with a rectangular opening at 22. A rectangular insert is fitted at the opening 22, the insert being a sleeve of insulation material identified at 24 having a liner 26 on the interior of the insulation. The two layers define an insulated compartment. It has a rectangular cross section and is shaped to assure that it could receive snacks and/or drinks of a specified size. For instance, the interior of the insulated compartment approximates that necessary to store and hold six 12 ounce drink containers and the like. Cold materials placed in this compartment are kept cold and do not warm because they are not in contact with the water 20. To this end, the compartment is constructed of a closed cell foam layer 24.

This compartment is covered by a lid 28. The lid is supported by a hinge 30 along one marginal edge, and a tab 32 at the opposite edge reaches over and latches against a fitting and coacting latch member 34. When closed and latched, a leak-proof seal is perfected. The lid is lined with insulation material also. This lining is constructed of the same material used elsewhere and is included to prevent thermal leakage. The lid can be planar, having the latch 32 which is finger engaged for opening and closing. As shown in the illustrated embodiment, the lid supports an additional storage chamber. Specifically, the lid has a rectangular shape as better shown in FIGS. 1 and 2. Since the lid is rectangular and is hinged along one edge, it can serve as a support for an additional rectangular container defined by the four walls at 38. It has a lid 40, the lid being joined by suitable hinge at 42 along one edge. It likewise has a closure tab 44 which hooks over a cooperating latch member 46. This closes this rectantular container. This container is constructed with a number of internal rectangular trays 48. The trays 48 are included to receive and store fishing tackle including lures, etc. The fishing tackle is placed in the several trays. When placed there, they can be stored indefinitely. After storage, it can be easily retrieved simply by unlatching the tab 44, raising the lid 40 and retrieving the desired equipment out of the storage container. Moreover, it can be closed and latched to assure safety when the fisherman does not require use of the apparatus. It is stored against loss as might occur by tipping over by the equipment shown in the drawings.

To summarize this portion of the equipment, the insulated container is at the bottom. It is shielded overhead from direct sun impingement by the rectangular storage compartment. This arrangement of the rectangular overhead compartment assures reduction in heat transfer. Likewise, the lower portions of the refrigerated compartment are completely enclosed within a rectangular support structure and thereby enable the fisherman to store refrigerated drinks or food in this compartment, and to also store fishing tackle and other equipment above the lid 28. Thermal insulation is not important for the top-most compartment. What is important is that the fishing tackle is organized in a closable location so that the fisherman has easy access to it. Moreover, these two storage compartments are easily operated. The latches are easily opened and closed. One can easily open the top or the bottom latch. It will be rare indeed that it was necessary to open both compartments simultaneously.

Figure 2:
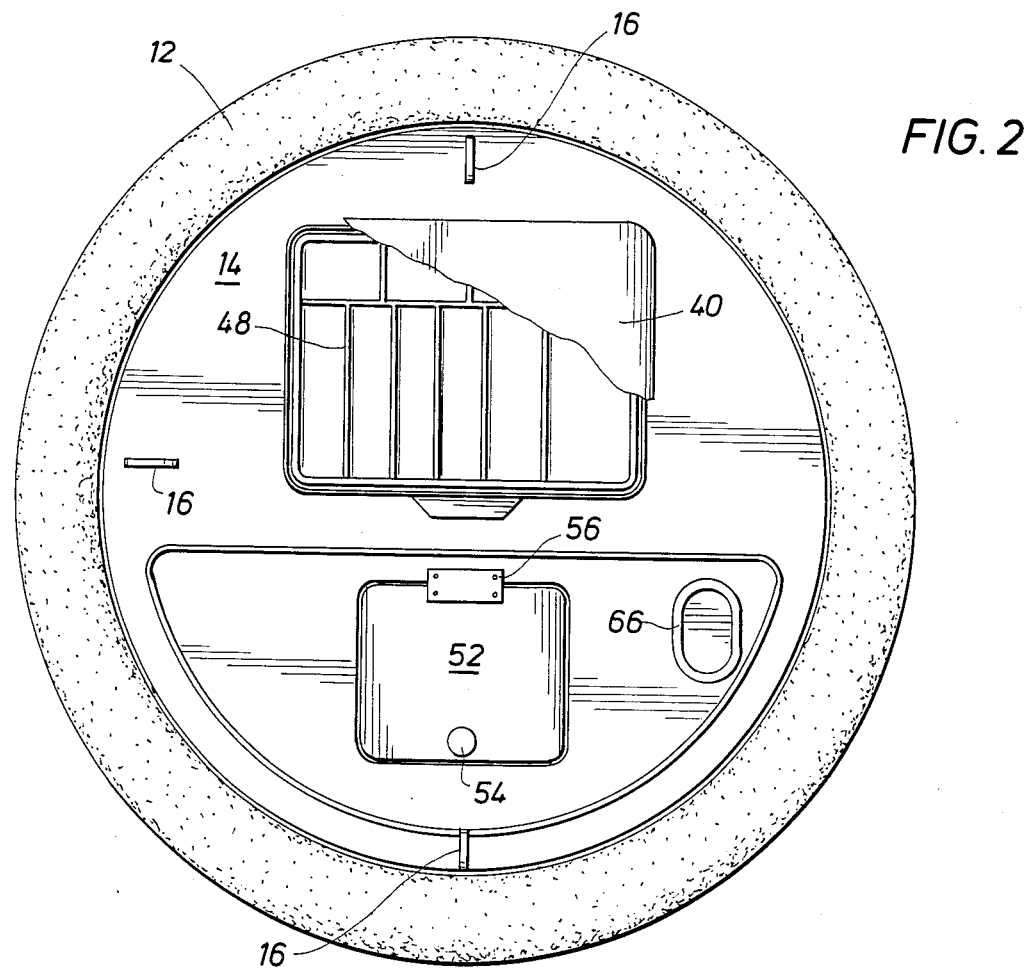
FIG. 2 is a top or plan view of the apparatus shown in FIG. 1 showing internal details of construction as a tackle box where the cover or roof has been broken away.
Figure 4:
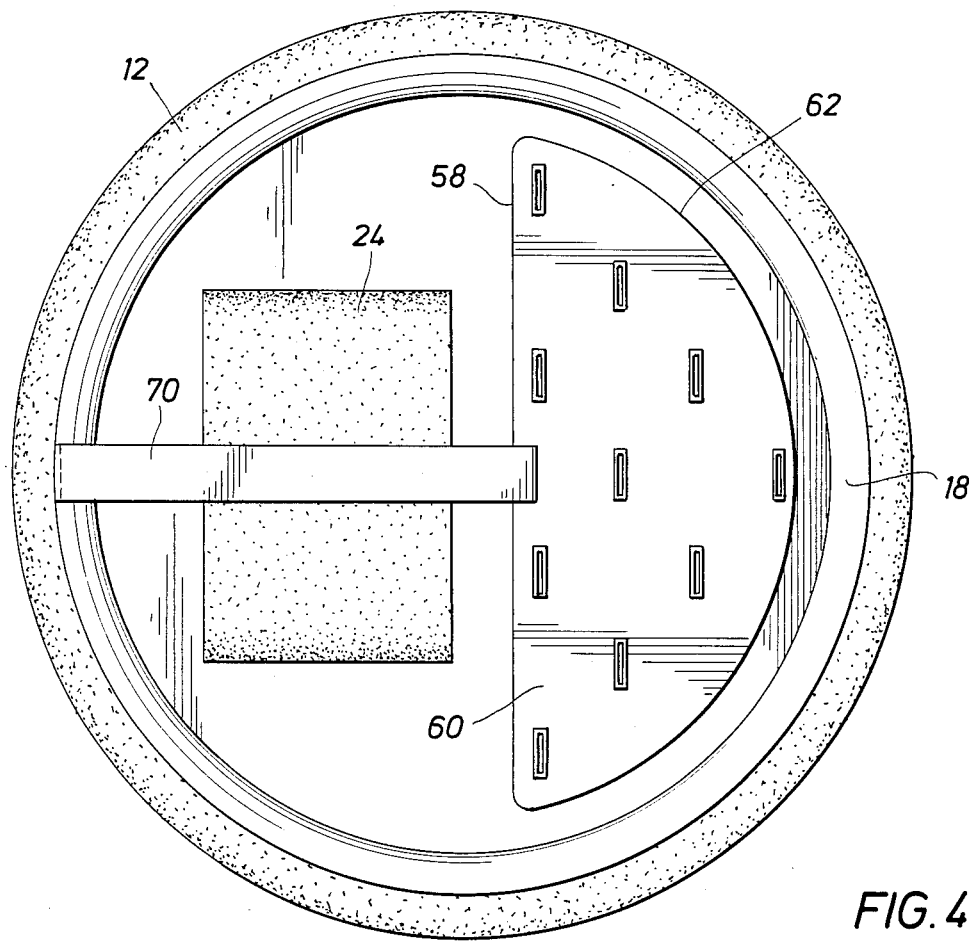
FIG. 4 is a bottom view of the structure in FIG. 3.

The present apparatus is thus supported by the ring 12 for flotation purpuses. It supports at one side a bait bucket identified generally at 50. The bait bucket 50 is closed with a lid 52 which is gripped by hand and opened on hinged movement. The lid 52 is shown in FIG. 2 of the drawings to support a knob or handle 54 and the opposite edge is connected to a hinge 56 to define means for mounting the lid cover 52 for closure. The bait bucket is defined by a back wall 58 which is straight along one edge. The wall 58 connects to a bottom 60. The bottom 60 is constructed with a number of openings in it and they are also found in the other walls. The bait bucket is also constructed with a partial cylindrical wall 62 which joins to the back wall 58. These two walls define a region or cavity which is more aptly illustrated in FIG. 4. There, the lower side of the apparatus is shown including the planar wall 58 and the curving wall 62. These two walls determine and define the size of the bait bucket cavity.

The lid is opened and closed by hinged movement by grasping the knob 54. Bait is placed on the interior. Bait is kept alive for long durations of time because the bait bucket includes a number of openings formed in it. This permits the water 20 to pass through the bait bucket and thereby provide additional oxygen for extending the life of the bait captured in the bait bucket. This arrangement insures an increased supply of oxygen for the bait.

Going further with the present apparatus, the numeral 64 identifies a rather tall receptacle having an exposed upper end at 66. The end 66 is above the deck 14. The top end is open. The receptacle 64 serves as a rack for storage of the handle end of a fishing rod or pole. The butt end of the pole is dropped into the receptacle 64 which holds the pole or rod more or less vertically upright. The pole is held in the upright position as a means of storage without tipping the bait bucket in the water. The pole is held upright to assure that the user can grasp the line, reel or other portions of equipment with both hands without having to hold the pole. Moreover, this arrangement positions the pole within the ring 12 so that stability is not disturbed. That is to say, the bait bucket is stable and is not tipped by the pole. The receptacle 64 is carefully sized so that the lower end of the handle is enclosed therein. This holds the rod upright even though the fishing rod may be several feet long.

The present invention further includes a structural frame member 70 along a diameter across the equipment. It anchors at one end to the bait bucket 50 and has an upstanding tab 72 which joins to the opposite diametric side. This arrangement of the frame member 70 assures support of the bait bucket and holds it in proper alignment. The frame member 70 thus is a structural frame member to assure proper support of the equipment shown in the drawings and to particularly enable the equipment to be held together to define a unitary structure. Another important factor to note in this regard is the incorporation of the ring 12 surrounding the members which may be empty at one minute and filled at the next. The device is able to take water into the bait bucket. Even when the bait bucket is full of bait and water enters therein, the water level rises relative to the bait bucket to support all the equipment level on the body of water. This is assisted by incorporation of the resilient ring 12 fully around the apparatus. The ring 12 thus defines a center of buoyancy which is not tipped or offset. As observed in FIG. 4, the bait bucket 50 more or less counterbalances the apparatus including the various compartments. Stability in the water is thus assured. Also, stability is not disturbed when one or the other compartment is filled or empty.

Attention is now directed to use of the equipment. When the fisherman arrives at the body of water, the first step or procedure is to place the present apparatus in the water. At a convenient time, either standing on a dock or on shore, snacks and refreshments can be placed in the insulated chamber. This is done simply by disconnecting the tab 42, raising the lid and placing the cold materials on the interior. The lid is then closed and latched. In addition to this, the tackle necessary for the fisherman is placed in the tackle box. Again, this is done by simply raising the lid 40. After the tackle has been stored in the box, the lid is then closed and latched. The present apparatus can be easily placed in the water. This introduces water flow into the bait bucket 50. Live bait is dumped into the bait bucket through the lid 52. Conveniently, the fisherman can rest any manner of apparatus including a fishing rod in the receptacle 64. He can also use a landing net equipped with a handle and place the handle in the receptacle 64. The present apparatus is typically placed in the water before bait is placed in the bucket to assure that they have water to survive.

The present apparatus is then attached to the fisherman by means of a suitable short line or the like. In addition, the fisherman can attach a fish stringer to the present apparatus. The foregoing uses the upstanding tabs 16 on the deck member 14. The present apparatus is quite light, weighing just a few pounds and can be easily carried by the fisherman to the water. In the water, it is substantially weightless when it floats in the water. In the water, the present apparatus is also very convenient because it can float a few feet away from the fisherman and out of harm's way. Yet, when the fisherman requires bait or otherwise needs the present apparatus he can simply pull it closer by means of the tethered line connected to the floating apparatus.

Dimensionally, the present apparatus is about 30–36 inches in diameter. It floats at a depth so that 3–4 inches are above the water 20. The bait bucket holds a substantial quantity of water and hence is able to hold and sustain life for a large number of shrimp or minnows. It is perforate at numerous openings as illustrated in the drawings to assure the water is interchanged and thereby oxygenated. This extends the life of the bait.

The present apparatus is preferably made of plastic materials including closed cell foam for the supportive ring 12. Closed cell sheet foam is used to define the insulated compartment previously described.

While the foregoing is directed to the preferred embodiment, the scope is determined by the claims which follow.

What is claimed is:

1. A floatable bait bucket comprising:
   (a) a surrounding outer ring of foamed material floatable on water;
   (b) a circular deck member within said outer ring providing an exposed surface;
   (c) a bait bucket supported within said ring by said deck member wherein said bait bucket has
      (1) a downwardly extending encircling wall closed by a transverse bottom portion for containing live bait;
      (2) a lid over said bait bucket wherein said lid is hingedly mounted enabling said lid to open and close to permit access to the interior of said bait bucket;
      (3) perforations in said wall to interchange water for keeping the bait alive wherein said bait bucket extends below said deck member and into water supporting the floating bait bucket;
   (d) fishing tackle storage means supported by said deck member for receiving and storing fishing tackle therein, whreein said storage means also includes
      (1) a closable tackle lid thereover hingedly mounted for opening to expose fishing tackle within said storage means; and
      (2) latch means for securing said tackle lid, and wherein said latch means permits unlatched opening and latched closure;
   (e) a closed thermal insulated chamber means supported by said deck member wherein said chamber means extends below said deck member for receiving hot or cold materials therein and wherein said chamber means is formed by a wall and transverse bottom portion formed of heat insulated material;
   (f) a lid over said insulated chamber means wherein said lid is measured along a hinge at the edge of said lid and said lid is formed of thermal insulated material;
   (g) a supportive frame member connecting from said deck member to said bait bucket for holding said bait bucket in alignment wherein the bottom portion of said bait bucket is held below water and said bait bucket stands upright relative to said deck member;
   (h) upstanding connective tabs suitable for anchoring lines thereto for convenience of the fisherman wherein said tabs extend from said deck member, and said tabs enable anchoring lines to be connected thereto to assure that the floatable bait bucket does not float away from a fisherman using the floatable bait bucket;
   (i) an upstanding open ended receptacle in said deck member and extending downwardly therebelow and having a open upper end for receiving the handle end of a fishing rod or pole to support without the use of hands such a rod or pole to enable a fisherman to have both hands free;
   (j) wherein said outer ring is formed of closed cell foam material having a density sufficiently light to float the bait bucket on a water surface and wherein the water level causes water to enter said bait bucket through said perforations and said bait bucket floats at a level in the water determined by said ring; and
   (k) wherein said deck member is plastic and terminates at a circular surrounding downwardly extending skirt thereabout and said skirt has a conforming face for contacting against said ring and conforming thereagainst wherein the ring is joined to said skirt.

2. The apparatus of claim 1 wherein said skirt and deck member are unitary constructon.

3. The apparatus of claim 1 wherein said deck member has an upstanding and encircling peripheral edge adjacent to said chamber means and terminates at a overturned lip defining the upper end of said chamber means.

* * * * *